(12) United States Patent
Bock et al.

(10) Patent No.: US 7,055,084 B2
(45) Date of Patent: May 30, 2006

(54) METHOD AND SYSTEM FOR REGULATING THE DECISION THRESHOLD AND THE SAMPLING CLOCK PHASE OF A DATA REGENERATOR FOR A BINARY SIGNAL

(75) Inventors: Harald Bock, Augsburg (DE);
Wolfgang Peisl, Munich (DE);
Andreas Faerbert, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 793 days.

(21) Appl. No.: 10/075,025

(22) Filed: Feb. 11, 2002

(65) Prior Publication Data

US 2002/0163985 A1 Nov. 7, 2002

(30) Foreign Application Priority Data

Feb. 9, 2001 (EP) ................................ 01103107.7

(51) Int. Cl.
*H03M 13/00* (2006.01)
(52) U.S. Cl. ........................ 714/774; 714/746; 714/704
(58) Field of Classification Search ................. 714/774, 714/708, 786, 791, 760, 746, 704; 375/214, 375/316, 355, 376

See application file for complete search history.

(56) References Cited

U.S. PATENT DOCUMENTS

| | | | |
|---|---|---|---|
| 4,360,926 A | 11/1982 | Hedin et al. | |
| 4,823,360 A * | 4/1989 | Tremblay et al. | 375/214 |
| 6,188,737 B1 * | 2/2001 | Bruce et al. | 375/355 |
| 6,577,696 B1 * | 6/2003 | Burgmeier et al. | 375/376 |
| 6,580,763 B1 * | 6/2003 | Mullner et al. | 375/316 |
| 6,625,772 B1 | 9/2003 | Stoll | |
| 6,715,113 B1 * | 3/2004 | Bendak et al. | 714/708 |

FOREIGN PATENT DOCUMENTS

| | | |
|---|---|---|
| DE | 197 17 642 | 11/1998 |
| WO | WO 99/12315 | 3/1999 |

* cited by examiner

*Primary Examiner*—Albert Decady
*Assistant Examiner*—Fritz Alphonse
(74) *Attorney, Agent, or Firm*—Bell, Boyd & Lloyd LLC

(57) ABSTRACT

A method and system for regulating the decision threshold and the sampling clock phase of a data regenerator for a binary signal, wherein error correction signals for erroneous 1-bits and 0-bits are used for regulating the decision threshold of a decision stage, and further phase correction signals between transitions of binary signals serve for the phase regulation of a sampling clock signal.

4 Claims, 2 Drawing Sheets

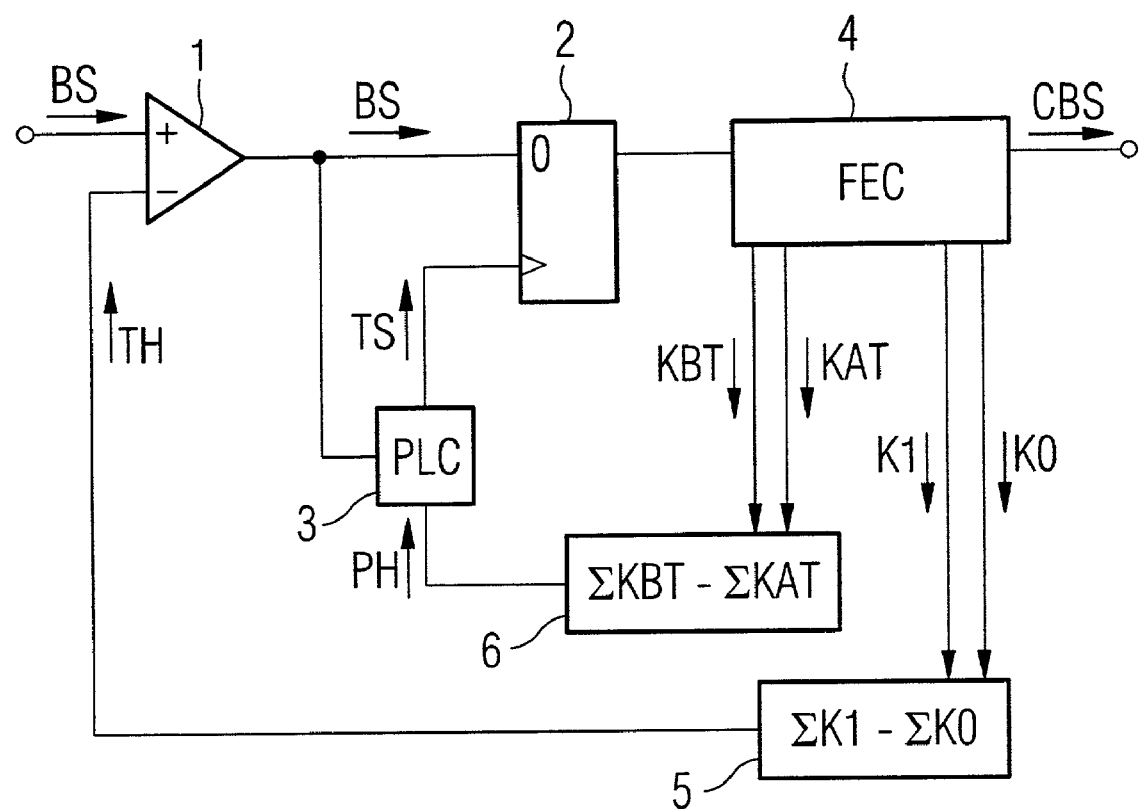

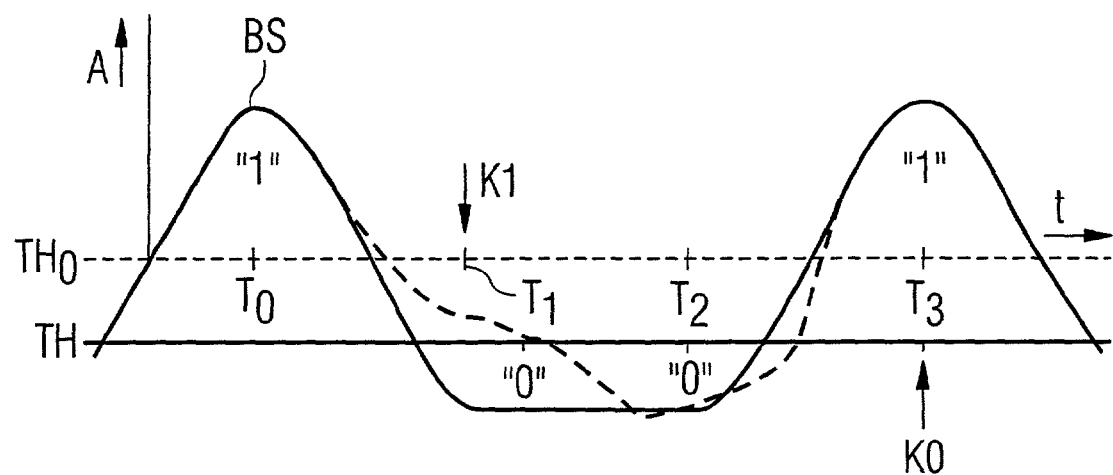
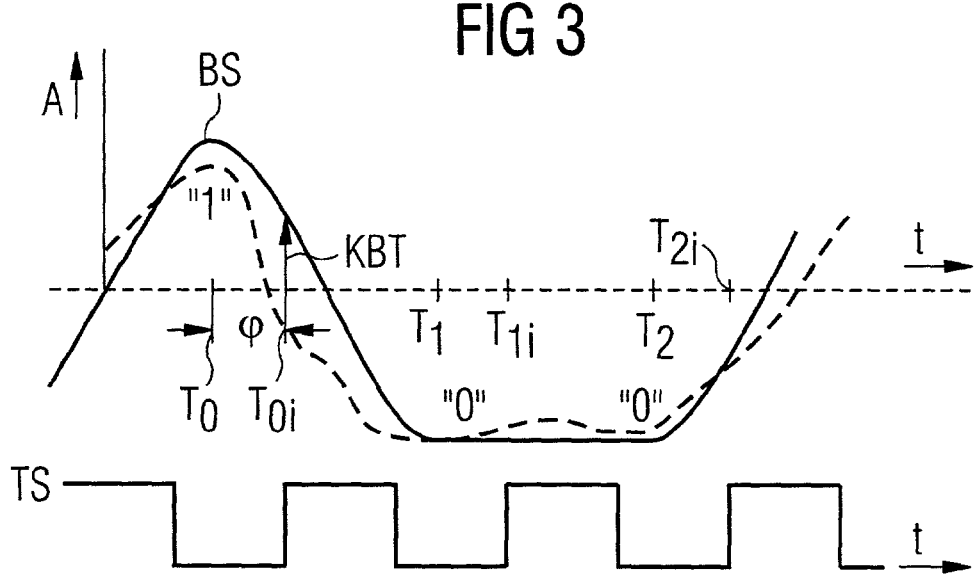

METHOD AND SYSTEM FOR REGULATING THE DECISION THRESHOLD AND THE SAMPLING CLOCK PHASE OF A DATA REGENERATOR FOR A BINARY SIGNAL

BACKGROUND OF THE INVENTION

The present invention relates to a method for regulating the decision threshold and/or the phase of a sampling clock signal of a data regenerator for a binary signal by evaluation of error correction signals.

Numerous circuits are known in which the decision threshold of a data regenerator and the phase of the sampling clock signal are corrected on the basis of criteria which are obtained from the received signal. In addition, there is a further group of data regenerators which, in the case of a redundant binary signal, utilize the error detection/error correction for controlling the decision threshold and the phase angle.

The published patent application DE 197 17 642 A1 discloses a method in which the decision threshold and the phase are varied with the aid of a control until the error rate reaches a minimum. In this method, the phase angle and the threshold always hunt around the optimum.

The U.S. Pat. No. 4,360,926 discloses a digital PLL (phase-locked loop) in which a phase comparison is carried out between the received signal and the sampling clock signal and, in addition, information of the error detector is used for optimization.

It is an object of the present invention, therefore, to develop a method and system for optimizing the decision threshold and/or the phase angle of the sampling clock signal.

SUMMARY OF THE INVENTION

Pursuant to the present invention, either the decision threshold or the sampling phase, or both, can be regulated by using the correction signals in connection with taking account of the logic state of the binary signal.

One advantage of this method is that it operates even at relatively high bit error rates.

In order to regulate the decision threshold, use is made of the difference between the number of corrected 1-bits, that is to say the corrected bit becomes a binary zero, and the number of corrected 0-bits, where correction into a binary one is effected. It is also possible to evaluate the quotient of corrected 1-bits to 0-bits (or vice versa). In the case of unbalanced codes, the relation of binary ones to binary zeros should be taken into account.

The correction signals are likewise used for regulating the phase of a sampling clock signal. For this purpose, a check is made to determine whether the number of corrections is larger before or after a transition between two different (corrected) binary states.

A corresponding arrangement can be achieved in an all-digital manner, thereby avoiding problems due to temperature dependence or aging as in the conventional clock regenerators.

It is also advantageous to monitor the frequency of corrections which, under constant transmission conditions, reproduces the mode of operation of the regulation. With optimized sampling, the frequency of corrections is a criterion for the signal quality which is additionally used for controlling the time constants of the regulating devices.

It is also advantageous to limit the variation range of the decision threshold in order for the operational capability to always be ensured.

The method according to the present invention also can be combined with the conventional analog methods in which the received signal is compared with the sampling clock signal for the purpose of phase correction.

Additional features and advantages of the present invention are described in, and will be apparent from, the following Detailed Description of the Invention and the Figures.

BRIEF DESCRIPTION OF THE FIGURES

FIG. 1 shows a basic circuit diagram of a data regenerator.
FIG. 2 shows a timing diagram for the regulation of the decision threshold.
FIG. 3 shows a timing diagram for the regulation of the phase of the sampling clock signal.

DETAILED DESCRIPTION OF THE INVENTION

FIG. 1 illustrates the data regenerator 1–6 according to the present invention. The signal BS is fed to a decision stage 1 and compared with a comparison value, the decision threshold TH. The binary output signal of the decision stage 1 is fed to the data input D of a sampling flip-flop 2 and its data bits are ideally latched (stored), in each case, in the bit center with a sampling clock signal TS generated by a controlled oscillator (VCO) (not illustrated) of a clock regenerator 3 (e.g., a phase-locked loop PLL). From the data output of the sampling flip-flop 2, the binary signal passes to an error correction device (FEC) 4, which outputs a corrected binary signal CBS at its data output.

On the basis of redundant information, the error correction device 4 identifies which bits of the binary signal are disturbed and corrects them by inversion. The correction signals are combined here with the binary state of the as-yet-uncorrected bit (logic combination with the state of the corrected bit is equivalent) and output as correction signals K1 and K0, respectively. K1 refers to a bit stored as binary state "1" in the sampling flip-flop 2 being corrected into the binary state "0"; K0 refers to a correction of the binary state "0" into the binary state "1". A decision threshold regulator 5 forms the difference between the sums of the K1 correction signals and K0 correction signals $\Sigma K1 - \Sigma K0$ and correspondingly shifts the threshold TH of the decision stage 1. The measurement intervals can be adapted to the bit error rate. It is also possible to count up to a specific number of correction operations, or have both methods combined.

The diagram of FIG. 2 illustrates the temporal profile of the amplitude A of an undisturbed binary signal BS as a function of time t as a solid line, which signal is sampled at the receiving end at instants $T_0, T_1, T_2 \ldots$. However, the decision threshold (sampling threshold) TH is not at its ideal value $TH_0$ (broken line), but significantly lower. An ideal signal BS is now still sampled correctly. However, if signal distortions now occur, then in the case of a disturbed signal (shown by a broken line), a corruption of the binary "0" into a binary "1" is very easily possible, which is reversed again by a correction operation K1. If the correction signals K1 outweigh the far less likely correction signals K0, then the decision threshold TH must be shifted in the direction of the optimum threshold $S_0$; in this case, toward higher values. Assuming that the binary "1" has the higher level, the following holds true for the decision threshold TH:

$$\Sigma K1 > \Sigma K0 \rightarrow TH \text{ higher} \quad (1)$$

$$\Sigma K1 < \Sigma K0 \rightarrow TH \text{ lower} \quad (2)$$

In the case of an unbalanced code, the following holds true (including mathematical transformations):

$$\frac{\sum K1}{N0} > \frac{\sum K0}{N1} \Rightarrow TH \text{ higher} \quad (3)$$

$$\frac{\sum K1}{N0} < \frac{\sum K0}{N1} \Rightarrow TH \text{ lower} \quad (4)$$

It is equally possible, as mentioned in the introduction, to compare the quotients of the summed correction signals with the quotient of the sum of the binary zeros N0 with the sum of the binary ones N1, whereby the ratio of binary zeros to ones is likewise taken into account.

The range in which it is possible to shift the decision threshold can be limited, so that the clock regenerator or the receiver always remains functional.

In a similar manner, correction signals KBT (before transition) and KAT (after transition) are obtained before and after the transition between two binary states. This is again done by combination of the correction signal with, in each case, a (corrected) bit before and after the transition between two binary states of the corrected signal, which generally corresponds to the original binary signal.

FIG. 3 again shows the amplitude profile of the binary signal BS as a function of time t. The desired sampling instants are denoted by $T_0, T_1, T_2, \ldots$, whereas the actual instants are denoted by $T_{0i}, T_{1i}, T_{2i}$. A phase error $\phi$ of the sampling signal relative to the ideal sampling instant or the signal, referred to as phase for short, increases the likelihood of incorrect samples in the case of state changes. By virtue of the fact that the sampling instant $t_{0i}$ moves nearer to the transition between the binary states, an "erroneous" sampling is effected in the case of additional influencing/disturbances of the binary signal BS (shown by a broken line). In this case, a 0-bit is sampled, which is corrected into a 1-bit by a correction operation KBT. By contrast, the phase shift of the clock signal is unimportant at the instant $T_{1i}$, since no signal transition takes place in the vicinity. Only in the vicinity of the instant $T_{2i}$ does the binary state change again from "0" to "1", as a result of which the likelihood of erroneous sampling increases again. In the case of the bit sequence illustrated, it is highly likely that there will be more phase corrections KBT during the transition from "1" to "0", as a result of the binary state "0" that is then maintained, than after the transition.

If the bit is incorrectly sampled as "0" before the signal transition in the case of a disturbed signal (shown by a broken line) and subsequently corrected, a phase correction signal KBT is output; which, in this case, indicates the correction of a binary "0" into a "1". Since the next (if appropriately corrected) bit is a zero, a transition between the binary states is present in the ideal or alternatively corrected binary signal. By contrast, if the bit is corrected after the transition, a phase correction signal KAT (After Transition) is output. These signals are summed in a phase regulator 6 and the sums are compared with one another. The result of this comparison, a clock phase correction signal PH, controls or corrects the phase angle of the clock signal TS in relation to the binary signal BS until the number of both correction signals has the same value. The following holds true:

$$\Sigma KBT > \Sigma KAT \rightarrow \text{phase } TS \text{ accelerate or increase frequency} \quad (5)$$

$$\Sigma KBT < \Sigma KAT \rightarrow \text{phase } TS \text{ decelerate or lower frequency} \quad (6)$$

The phase difference $\phi$ of the clock signal TS relative to the ideal sampling instants $T_0, T_1, T_2, \ldots$ for the binary signal BS is to be reduced in the example illustrated. The same applies, correspondingly, in the case of a leading phase of the clock signal.

In the exemplary embodiment of FIG. 1, the phase of the clock signal generated by the clock regenerator 3, designed here as a phase-locked loop (PLL), is corrected. As a rule, the correction will be small and can be limited. The phase can be changed in any desired manner; particularly, by simple intervention in the phase-locked loop as in the exemplary embodiment.

Without additional measures, the method of the present invention operates only if, before or after a transition between the binary states, the binary state is preserved for at least one further bit. In the case of a 1010 change, it is highly likely that the phase correction signals will cancel out. They also can be suppressed by evaluation of the bit sequences. In the case of a continual change of binary zeros and binary ones, the phase correction is not achieved without additional measures. However, this situation does not occur in customary data transmission and, moreover, the function of the analog phase regulation is preserved.

By monitoring the correction rate, it is possible to check the transmission link and control the regulating devices of the data regenerator.

Although the present invention has been described with reference to specific embodiments, those of skill in the art will recognize that changes may be made thereto without departing from the spirit and scope of the invention as set forth in the hereafter appended claims.

The invention claimed is:

1. A method for regulating a threshold and a relative phase of a sampling clock signal with respect to a phase of a binary signal by evaluation of error correction signals, wherein the threshold is associated with an optimum ratio, the method comprising the steps of:
   evaluating both a number of 1-bits detected as erroneous and a number of 0-bits detected as erroneous;
   adjusting the threshold according to the evaluating step to achieve the optimum ratio of the number of 1-bits detected as erroneous and the number of 0-bits detected as erroneous;
   evaluating a number of bits detected as erroneous before a transition between binary states and a number of bits detected as erroneous after a transition between the binary states; and
   adjusting the phase of the sampling clock signal such that the number of bits detected as erroneous before and after the transition between the binary states are substantially the same.

2. A method for regulating a threshold and a relative phase of a sampling clock signal as claimed in claim 1, the method further comprising the steps of:
   forming a difference between the number of 1-bits detected as erroneous and the number of 0-bits detected as erroneous; and
   converting the difference into an actuating signal for the threshold.

3. A method for regulating a threshold and a relative phase of a sampling clock signal as claimed in claim 2, the method further comprising the step of setting the threshold, for balanced codes, such that the difference becomes zero.

4. A system for regulating a decision threshold and a phase of a sampling clock signal of a data regenerator having a decision stage, to which a binary signal and a comparison signal are fed, the system comprising:
- a sampling flip-flop having a data input connected to an output of the decision stage;
- a controllable clock regenerator which generates a sampling clock signal for the sampling flip-flop;
- an error correction device for controlling the controllable clock regenerator; and
- a first regulator, wherein a first correction signal, fed into the first regulator from the error correction device, indicates a correction of a 1-bit, and a second correction signal being fed to the first regulator from the error correction device which indicates a correction of a 0-bit, wherein the first regulator separately sums and assesses the first and second correction signals and generates a control signal which determines a magnitude of the comparison signal to adjust the decision threshold to achieve an optimum ratio of the number of 1-bits detected as erroneous and the number of 0-bits detected as erroneous;
- a second regulator, wherein a first phase correction signal, fed into the second regulator from the error correction device, indicates a correction of a bit before a signal transition between two binary states, and a second phase corrections signal being fed to the regulator which indicates a correction of a bit after a signal transition between two binary states, the second regulator counting the correction signals and comparing the sums to generate a phase correction signal which generates the phase of sampling clock signal such that at least approximately a same number of correction signals occurs before and after a transition between the binary state.

* * * * *